March 3, 1959 H. E. HRUSKA 2,875,781
DIAPHRAGM TYPE CONTROL VALVE HAVING HYDRAULIC REACTION
Filed July 24, 1953 2 Sheets-Sheet 1

INVENTOR.
HOWARD E. HRUSKA
BY
Cecil J Arens
ATTORNEY

March 3, 1959 H. E. HRUSKA 2,875,781
DIAPHRAGM TYPE CONTROL VALVE HAVING HYDRAULIC REACTION
Filed July 24, 1953 2 Sheets-Sheet 2

INVENTOR.
HOWARD E. HRUSKA
BY
Cecil J Arens
ATTORNEY

United States Patent Office 2,875,781
Patented Mar. 3, 1959

1

2,875,781

DIAPHRAGM TYPE CONTROL VALVE HAVING HYDRAULIC REACTION

Howard E. Hruska, South Bend, Ind., assignor to Bendix Aviation Corporation, South Bend, Ind., a corporation of Delaware Application July 24, 1953, Serial No. 370,009

4 Claims. (Cl. 137—622)

This invention relates to valves and more particularly to valves of the hydraulic reaction type.

It is an important object of the invention to provide a valve having a novel structure for use with the power steering apparatus of an automobile or other vehicle.

A further object of the invention is to employ flexible discs as poppet valve members.

Another important object resides in the provision of a valve the parts of which can be mass produced and assembled with a minimum of cost due to the elimination of close tolerances between the valve members.

The above and other objects and features of the invention will become apparent from the following description of the apparatus taken in connection with the drawings which form a part of this invention and in which.

Figure 1:
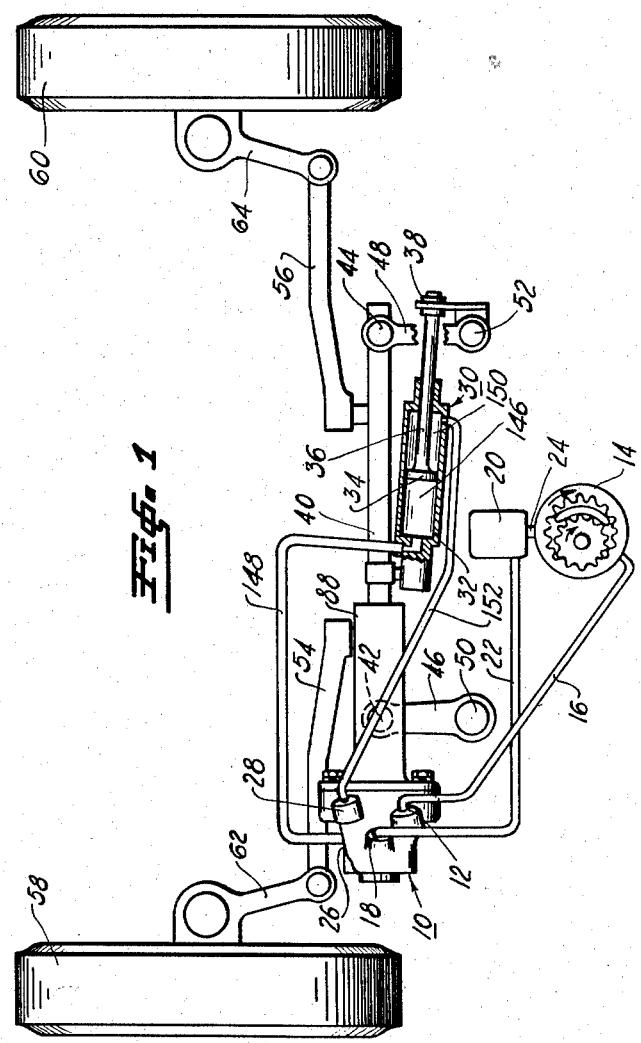
Figure 1 is a schematic view of the steering mechanism of an automobile with which the valve of the invention can be used.

Referring now to Figure 1 of the drawings, the steering mechanism shown includes a valve 10 having an inlet port 12 connected to pump 14 by conduit 16. Return or outlet port 18 of valve 10 is connected to reservoir 20 via conduit 22, and the reservoir 20 is, in turn, connected to the inlet side of pump 14 by conduit 24. Working ports 26 and 28 of valve 10 are connected to opposite ends of double-acting power unit 30 comprising a cylinder 32 and a piston 34. Piston rod 36 is securely fastened to the body or frame of the automobile at 38; and cylinder 32 is pivoted to cross link 40, one end of which carries the valve 10. Cross link 40 is pivoted at 42 and 44 to pitman arm 46 and idler arm 48 respectively. Pitman arm 46 is journalled to pitman shaft 50 extending from the steering gear, not shown, of the automobile, and idler arm 48 is pivoted to the frame of the automobile at 52 to thereby allow arcuate motion of the cross link about pitman shaft 50 and pivot 52. Cross link 40 is connected to reach rods 54 and 56 which are, in turn, connected to the front wheels 58 and 60 of the automobile by steering arms 62 and 64 respectively. The steering mechanism forms no part of the present invention and is included herein only to show an application with which the valve may be used.

Figure 2:
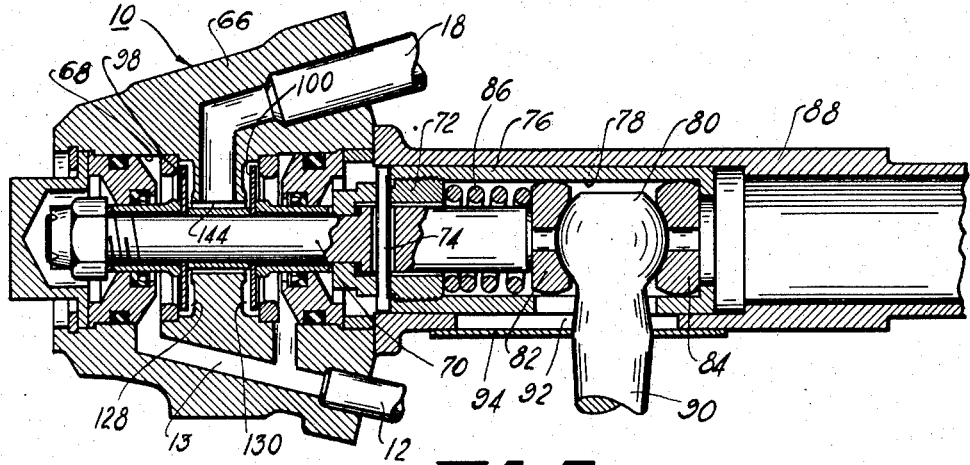
Figure 2 is a sectional view of the device of the invention showing the inlet and return ports of the valve.

Referring now to Figure 2, the valve 10 comprises a body 66 having a bore 68 therein. Centrally located within bore 68 is an axially movable shaft 70 which is keyed to a socket 72 by pin 74. Socket 72, in turn, threadedly engages tube-socket 76 to form a cylindrical cavity

2

78 which serves as a housing for stud-ball 80 interposed between stud-ball seats 82 and 84. Coil spring 86 is interposed between socket 72 and stud-ball seat 82 to yieldingly hold the stud-ball between its associated seats. Sleeve 88, which is fastened to cross link 40, as shown in Figure 1, is bolted to body 66 by bolts or any other satisfactory fastening means, not shown, and serves as a chamber in which the stud-ball mechanism can reciprocate. Extension 90 of stud-ball 80 extends through slot 92 formed in sleeve 88 and is secured at its outer extremity to pitman arm 46. Slot 92 is provided with a dust cover 94 fastened to the extension 90.

Figure 3:
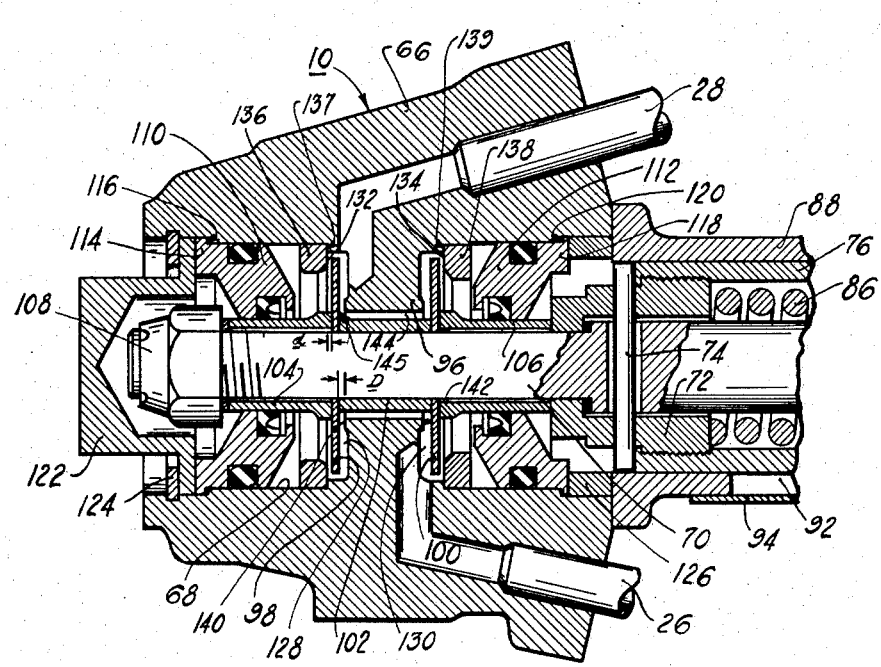
Figure 3 is an enlarged sectional view of the device showing the working ports of the valve.

Referring to Figure 3, it can be seen that on opposite sides of a reduced diameter portion 96 of bore 68 are positioned identical flexible disk valve members or diaphragms 98 and 100 which are separated by spacer 102. Spacers 104 and 106 axially position the diaphragms in the bore and are held securely against the diaphragms between socket 72 and nut 108 which threadedly engages shaft 70. Bushings 110 and 112 are carried between body 66 and spacers 104 and 106 respectively. Bushing 110 has an enlarged diameter portion 114 which engages shoulder 116 of bore 68, and bushing 112 has a similar portion 118 engaging shoulder 120. The valve is provided with an end plug 122 which serves to hold bushing 110 against shoulder 116. End plug 122 is, in turn, securely held against bushing 110 by snap ring 124. Bushing 112 is, in a similar manner, held against its shoulder 120 by spacer 126 which abuts sleeve 88. Suitable ring seals are employed as shown to provide a fluid seal between the bushings and the parts adjacent thereto.

The positioning of bushings 110 and 112 as described above forms within valve body 66, and on each side of reduced diameter portion 96, annular cavities or passages 128 and 130. Note that these passages serve to house diaphragms 98 and 100 and that both passages are connected to the inlet port 12 via passage 13 (Figure 2). As seen in Figure 3, passage 128 is connected to working port 28 and passage 130 is, in a similar manner, connected to working port 26. Annular channel 144, formed between the reduced diameter portion 96 and spacer 102, serves to connect passages 128 and 130 with return port 18 as best shown in Figure 2. Mounted in juxtaposition to diaphragms 98 and 100 are collars 136 and 138, both of which are fitted within bore 68 to abut shoulders 137 and 139 respectively. On the surfaces of collars 136 and 138, opposite diaphragms 98 and 100 respectively, are formed annular valve seats 132 and 134 on which the outer radial portions of the diaphragms are seatable. The inner radial portions of the sides of diaphragms 98 and 100 which face each other are seatable on a second pair of annular valve seats 140 and 142 formed on the reduced diameter portion 96. Note that the annular valve seats 132 and 134 have a greater radius than annular valve seats 140 and 142 and that in neutral position, wherein the diaphragms are not in contact with either of the valve seats as illustrated in Figure 3, the distance (D) between diaphragm 98 and valve seat 132 is shorter than the distance (D) between the diaphragm 98 and valve seat 140. A corresponding distance relationship exists in regard to diaphragm 100. If shaft 70, which is free to reciprocate in bushings 110 and 112, moves to the left the diaphragm 98, because of the distance relationship outlined above, will be seated on valve seat 132 before diaphragm 100 can be seated on seat 142. Therefore, when diaphragm 100 is seated on seat 142 and the combination of shaft 70 and the diaphragms can move no further to the left, a bending moment will be produced in diaphragm 98 about its center at 145 tending to hold it securely against valve seat 132. If no such moment existed, inlet pressure acting on diaphragm 98 would force it away from valve seat 132 and, consequently, there would be no effective seating of the valve on its outer seat. If shaft 70 moves to the right, the process is simply reversed.

Assuming, now, that the valve is in neutral position as shown in Figures 2 and 3, it can be seen that communication is established between all of the ports of the valve. However, since in this position both sides of the double-acting power unit 30 will be connected to the same source of pressure, a state of equilibrium will exist and fluid will flow through neither of the working ports. Any fluid from pump 14 entering the inlet port 12 will flow out return port 18 to reservoir 20.

If the steering wheel of the automobile and, consequently, pitman shaft 50 are rotated in either direction, stud-ball 80 which is connected to pitman arm 46 will exert a force against one or the other of stud-ball seats 82 or 84. If force is applied against seat 82, shaft 70 will be forced to the left. This will cause diaphragm 98 to seat on valve seat 132 and diaphragm 100 to seat on valve seat 142. The seating arrangement thus effected establishes communication between inlet port 12 and working port 26 via passage 130, and between working port 28 and return port 18 via passage 128. Fluid entering the inlet port cannot flow past valve seat 132 nor past valve seat 142. It must flow out port 26 to chamber 146 of double-acting power unit 30 via conduit 148. The power unit will, therefore, be actuated to force cross link 40 to the left, and fluid in chamber 150 will be exhausted therefrom via conduit 152 and port 28 to return port 18. Thus, the driver of the automobile need exert only sufficient force in turning the steering wheel to actuate valve 10, actual turning effort being applied by power unit 30. When the force applied to stud ball seat 82 is removed, reaction pressure acting on diaphragm 98 will return the valve to neutral position. Such movement to a neutral position occurs due to the following conditions. When the shaft 70 has moved to the left, at which time diaphragm 98 is seated on valve seat 132 and diaphragm 100 is seated on valve seat 142, the inlet pressure will act on diaphragm 98 over an area determined by valve seat 132 and the point at which the seal in bushing 110 is located against spacer 104, thereby creating a force acting toward the right which tends to return the shaft and valve members to neutral. Inlet pressure will also effectively act against diaphragm 100 between valve seat 142 and the point at which the seal in bushing 112 is located against spacer 106, thereby creating a force acting toward the left. The remainder of the combined areas of the diaphragms will have pressures acting on them which are in equilibrium. Since the dimension of spacers 104 and 106 are identical the resultant reaction force, therefore, will be toward the right and the effective reaction area will be defined by the difference in radii (or diameters) of the two valve seats 132 and 140.

If, for any reason, the valve or hydraulic system should fail, the force exerted on stud ball seat 82 will be transmitted via shaft 70 to cross link 40, and the combination will function as a conventional steering linkage.

Rotation of pitman shaft 50 in the opposite direction will cause a force to be exerted on stud ball seat 84 thereby reversing the process described above and causing cross link 40 to shift in the opposite direction.

Although this invention has been described in connection with certain specific embodiments, the principles set out are susceptible of numerous other applications as will be readily apparent to persons skilled in the art.

Having thus described the various features of the invention, what I claim as new and desire to secure by Letters Patent is:

1. A valve device comprising an inlet port, a return port, two annular passages connecting the inlet port with the return port, a first working port connected to one of said passages, a second working port connected to the other of said passages, and valve means in each of said passages to control communication between said ports, said valve means comprising a first annular valve seat interposed between said inlet port and the working port associated with said valve means, a second annular valve seat interposed between said associated port and said return port, and a poppet valve member in the form of a flexible disc diaphragm interposed between and seatable on said first and second valve seats, the distance between said first valve seat and the diaphragm being less than the distance between said second valve seat and the diaphragm when said diaphragm is in a neutral position, said valve device being such that when the valve member in one of said passages is seated on its first seat, the valve member in the other of said passages is seated on its second seat respectively, the valve member seated on its first seat being seated before the valve member seated on its second seat, said valve members being returned to neutral position by the inlet pressure acting on the effective reaction area of one of the valve members in the said passages, said effective reaction area being defined by the difference in the radii of said first and second valve seats.

2. A valve device comprising an inlet port, a return port, two passages connecting the inlet port with the return port, a first working port connected to one of said passages, a second working port connected to the other of said passages, and valve means in each of said passages to control communication between said ports, said valve means comprising a first valve seat interposed between said inlet port and the working port associated with said valve means, a second valve seat having a lesser diameter than said first valve seat interposed between said associated port and said return port, and a poppet valve member in the form of a flexible diaphragm interposed between and seatable on said first and second valve seats, said valve device being such that when the valve member in one of said passages is seated on its first seat, the valve member in the other of said passages is seated on its second seat respectively, said valve members being urged toward a neutral position by inlet pressure acting on the effective reaction area of one of the valve members, said effective reaction area being defined by the difference in diameters between said first and second valve seats.

3. A valve device comprising an inlet port, a return port, two passages connecting the inlet port with the return port, a first working port connected to one of said passages, a second working port connected to the other of said passages, and valve means in each of said passages to control communication between said ports, said valve means comprising a first valve seat interposed between said inlet port and the working port associated with said valve means, a second valve seat having a lesser diameter than said first valve seat interposed between said associated port and said return port, and a flexible diaphragm interposed between and seatable on said first and second valve seats to effectuate the said control, said valve members being urged to a neutral position by inlet pressure acting on the effective reaction area of one of the valve members, said effective reaction area being defined by the difference in diameters between said first and second valve seats.

4. A valve device comprising an inlet port, a return port, two annular passages connecting the inlet port with the return port, a first working port connected to one of said passages, a second working port connected to the other of said passages, and valve means in each of said passages to control communication between said ports, said valve means comprising a first annular valve seat interposed between said inlet port and the working port associated with said valve means, a second annular valve seat interposed between said associated port and said return port, and a poppet valve member in the form of a flexible disc diaphragm seatable on said first and second valve seats to effectuate the said control, said disc diaphragms being returned to neutral position by the inlet pressure acting on the effective reaction area of one of the diaphragms in said passages, said effective reaction area being defined by the difference in the radii of said first and second valve seats.

References Cited in the file of this patent

UNITED STATES PATENTS

| | | |
|---|---|---|
| 1,921,092 | Newton | Aug. 8, 1933 |
| 2,432,721 | Brown | Dec. 16, 1947 |
| 2,624,585 | Churchill | Jan. 6, 1953 |
| 2,640,494 | Kouwovsky | June 2, 1953 |
| 2,703,106 | Borgerd | Mar. 1, 1955 |
| 2,741,264 | Leonard | Apr. 10, 1956 |